No. 802,419. PATENTED OCT. 24, 1905.
J. S. STONE.
SPACE TELEGRAPHY.
APPLICATION FILED JAN. 15, 1904. RENEWED AUG. 14, 1905.
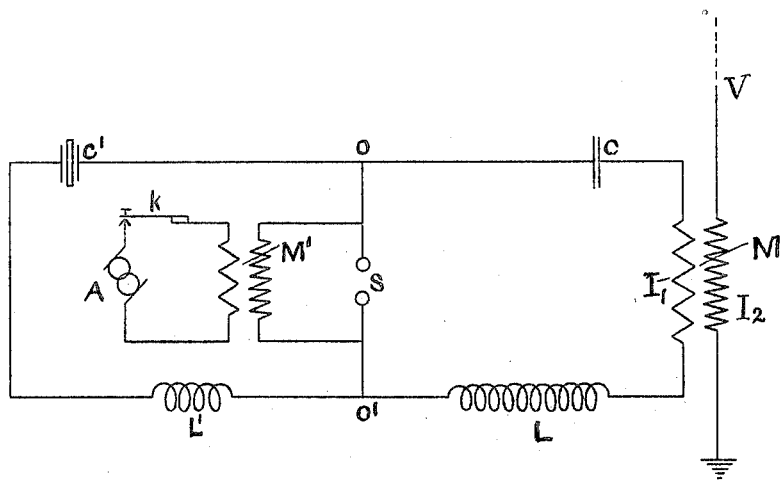

UNITED STATES PATENT OFFICE.

JOHN STONE STONE, OF CAMBRIDGE, MASSACHUSETTS, ASSIGNOR TO WILLIAM W. SWAN, TRUSTEE, OF BROOKLINE, MASSACHUSETTS.

SPACE TELEGRAPHY.

No. 802,419.      Specification of Letters Patent.      Patented Oct. 24, 1905.

Original application filed November 25, 1903, Serial No. 274,238. Divided and this application filed January 15, 1904. Renewed August 14, 1905. Serial No. 274,237.

*To all whom it may concern:*

Be it known that I, JOHN STONE STONE, a citizen of the United States, and a resident of Cambridge, in the county of Middlesex and State of Massachusetts, have invented a certain new and useful Improvement in Space Telegraphy, of which the following is a specification.

My invention relates to the art of transmitting intelligence from one station to another by means of electromagnetic waves without the use of wires to guide the waves to their destination; and it relates more particularly to a method of increasing the amplitude and the persistency of electrical oscillations developed in a sonorous circuit whereby the amplitude and the persistency of the corresponding electrical oscillations developed in an elevated conductor associated with the sonorous circuit may in like manner be increased.

In my letters patent No. 714,756, Dec. 2, 1902, and in other Letters Patent, I have described a system of selective electric signaling in which forced simple harmonic electric vibrations of definite frequency are developed in an elevated conductor by associating the latter with a sonorous or persistently oscillating circuit capable of developing like vibrations of corresponding frequency when its electrical equilibrium is disturbed. In this system of selective space telegraphy an alternating current generator or similar source of periodically varying electro motive force is employed to charge a condenser in the sonorous circuit and this condenser discharging across a spark gap gives rise to a train of electric oscillations in said circuit which, by virtue of the inductance of the circuit, may be very persistent. The forced electric vibrations developed in the elevated conductor cause the radiation therefrom of simple harmonic electromagnetic waves of corresponding frequency which develop simple harmonic electric vibrations in the elevated conductor at a receiving station. The electric vibrations so developed are conveyed to a closed resonant circuit associated with said elevated conductor and as these oscillations persist, as above stated, for a relatively great length of time, the amplitude of the vibrations developed in the resonant circuit is greatly increased because of the ability of a resonant circuit to co-ordinate the amplitudes of the oscillations of the frequency to which it is attuned. This persistency of electric oscillation in a resonant circuit has long been recognized as prerequisite to the amplification by such circuit of the amplitude of the oscillations of the frequency to which it is attuned, and the inability to produce such persistency of electric oscillation has been one of the causes of failure of so-called selective space telegraph systems. The object of this invention is, first, to increase the amplitude of the oscillations developed by the sonorous circuit and, second, to increase the persistency of these oscillations, i. e., to increase the number of oscillations which may be developed by the sonorous circuit before the amplitude of these oscillations falls to $\frac{1}{e}$th of its initial amplitude.

The drawings which accompany and form a part of this specification illustrate diagrammatically one form of apparatus whereby the herein described method may be conveniently carried out. This apparatus, however, forms no part of this invention, having been claimed in my application Serial Number 182,631, filed November 25, 1903.

In the drawings,

V is an elevated conductor.

M M' are transformers.

$I_1$ $I_2$ are respectively the primary and secondary windings of the transformer M, which may be as desired a step-up or a step-down transformer.

C C' are condensers.

L L' are inductances.

$s$ is a spark gap.

A is an alternating current generator or other suitable source of electrical energy.

$k$ is a key.

The circuit $s$ C $I_1$ L is a sonorous circuit adapted to develop electric oscillations of a definite frequency when its electrical equilibrium is disturbed, and the circuit $s$ C' L' is a sonorous circuit adapted to develop electric oscillations of frequency equal to those developed by the circuit $s$ C $I_1$ L.

The function of the coil L is to render the product of the inductance of the circuit $s$ C $I_1$ L and the elevated conductor with which said circuit is associated, large compared to the square of the mutual inductance between the two circuits, as explained in my hereinbefore mentioned Letters Patent. The condenser C is preferably a condenser having a dielectric of air, but the condenser C' may have a solid dielectric so as to increase the capacity of said condenser per unit of cubical contents as explained in my application Serial Number 182,541.

The ratio of the inductance of the circuit $s$ C $I_1$ L to the capacity of the circuit is made relatively large so as to obtain great persistency of oscillation, but in the circuit $s$ C' L' the ratio of the inductance of the coil L' to the capacity of the condenser C' is made relatively small by making the capacity of the condenser C' relatively large so that although but few oscillations, say four or five, are maintained before the amplitude of these oscillations falls to $\frac{1}{e}$th of its initial value, a great amount of energy may be stored in the condenser C', and therefore a great amount of energy may be discharged across the spark gap with the result that the spark produced by the combined discharges of condensers C and C' is made larger, or "fatter", than if the second sonorous circuit $s$ C' L' were not employed. In this way, the impedance offered by the spark gap to the oscillations developed in the circuit $s$ C $I_1$ L is initially greatly reduced and therefore the length of the spark may be correspondingly increased and the amplitude of the oscillations greatly increased.

When the spark at $s$ ceases, the system does not cease to vibrate as would be the case if the circuit $s$ C' L' were not employed, but on the contrary these oscillations then pass through the circuit $o$ C' L' $o'$ in shunt to the spark gap $s$ and as this circuit is resonant to the frequency of the oscillations developed by the circuit $s$ C $I_1$ L, it offers to said oscillations no opposition other than that offered by its ohmic resistance, which should be made as small as possible. The oscillating circuit is now the circuit C' $o$ C $I_1$ L $o'$ L' C' which has the same natural period as that of the sonorous circuits $s$ C' L' and $s$ C $I_1$ L as will be apparent from consideration of the factors involved in the determination of the period of this circuit. The period of this circuit depends upon the factor $\frac{C_1 C_2}{C_1 + C_2}(L_1 + L_2)$ which will be seen to be equal to the products $C_1 L_1$ and $C_2 L_2$, which products respectively determine the periods of the circuits $s$ C' L' and $s$ C $I_1$ L, where $C_1 C_2$ represent the capacity, and $L_1 L_2$ the inductance, of these circuits.

I claim—

1. The method of developing electromagnetic waves which consists in charging the condensers of two sonorous circuits, discharging said condensers across a common spark gap, developing thereby in each sonorous circuit electrical oscillations of the same frequency and impressing the resulting electrical oscillations upon an elevated conductor.

2. The method of transmitting signals by electromagnetic waves which consists in charging the condensers of two sonorous circuits in accordance with the signal to be transmitted, discharging said condensers so charged across a common spark gap, developing thereby in each sonorous circuit electrical oscillations of the same frequency, impressing the resulting electrical oscillations upon an elevated conductor and thereby transmitting electromagnetic waves modified in accordance with the signal to be transmitted.

3. The method of increasing the amplitude of electrical oscillations developed in a sonorous circuit which consists in reducing the resistance interposed by the spark gap of said sonorous circuit to such electrical oscillations by discharging a large amount of electrical energy across said spark gap by means of a source external to said sonorous circuit.

4. The method of increasing the persistency of electrical oscillations developed in a sonorous circuit which consists in automatically diverting the path of such electrical oscillations from the spark gap of the sonorous circuit without altering the frequency of the electrical oscillations.

5. The method of increasing the persistency of electrical oscillations developed in a sonorous circuit which consists in disturbing the electrical equilibrium of said sonorous circuit, thereby developing electrical oscillations of definite frequency therein, and diverting said electrical oscillations to a circuit, resonant to said definite frequency and connected in shunt to the spark gap of said sonorous circuit, thereby automatically diverting the path of said electrical oscillations from said spark gap without altering the frequency of the electrical oscillations.

6. The method of increasing the amplitude and persistency of electrical oscillations developed in a sonorous circuit which consists in reducing the resistance of the spark gap of said sonorous circuit by discharging a relatively large amount of electrical energy across said spark gap from a source external to said sonorous circuit and then automatically diverting the path of said electrical oscillations from said spark gap.

7. The method of developing electromagnetic waves of definite frequency which consists in disturbing the electrical equilibrium of two sonorous circuits, each attuned to said definite frequency, by means of a common spark gap and conveying the resulting electrical oscillations to a radiating conductor.

8. The method of developing electromagnetic signal waves of definite frequency which consists in simultaneously disturbing the electrical equilibrium of a plurality of sonorous circuits by means common to said circuits, developing thereby in each of said sonorous circuits electrical oscillations of the same definite frequency, and converting the energy of the resulting electrical oscillations into electroradiant energy.

In testimony whereof I have hereunto subscribed my name this 15th day of January, 1904.

JOHN STONE STONE.

Witnesses:
  HUGH M. STERLING,
  ARTHUR L. BRYANT.